(12) United States Patent
Fujigaya et al.

(10) Patent No.: US 6,601,177 B1
(45) Date of Patent: Jul. 29, 2003

(54) SEMICONDUCTOR INTEGRATED CIRCUIT (75) Inventors: Masaki Fujigaya, Tokyo (JP); Tsugumi Matsuishi, Tokyo (JP); Taketora Shiraishi, Tokyo (JP); Yutaka Uneme, Tokyo (JP); Satoru Kinoshita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 522 days.

(21) Appl. No.: 09/636,553

(22) Filed: Aug. 11, 2000

(30) Foreign Application Priority Data

May 12, 2000 (JP) .................................. 2000-140623

(51) Int. Cl.[7] .................................................. G06F 1/26
(52) U.S. Cl. ..................................................... 713/300
(58) Field of Search .................................. 713/300, 320, 713/323, 330, 340; 307/43, 75, 76, 85–87

(56) References Cited

U.S. PATENT DOCUMENTS 5,014,226 A * 5/1991 Horstmann et al. ............. 716/4
5,625,803 A * 4/1997 McNelly et al. ............... 703/14
6,292,015 B1 * 9/2001 Ooishi et al. .................. 326/33
6,483,165 B2 * 11/2002 Ooishi et al. ................ 257/499

FOREIGN PATENT DOCUMENTS

JP   3-34361    2/1991
JP   9-330135   12/1997

* cited by examiner

Primary Examiner—Thomas M. Heckler
(74) Attorney, Agent, or Firm—Leydig, Voit & Mayer, Ltd.

(57) ABSTRACT

A semiconductor integrated circuit including circuit groups and driving the circuit groups with respective power supply voltages, digital-to-analog converters that supply the power supply voltages to the circuit groups, and delay measurement circuits that measure delays of circuit element of the circuit groups. This semiconductor integrated circuit includes a central processing unit that establishes settings of registers based on measurements by the delay measurement circuits to control each of the power supply voltages.

6 Claims, 7 Drawing Sheets

SEMICONDUCTOR INTEGRATED CIRCUIT

FIELD OF THE INVENTION

The present invention relates to a semiconductor integrated circuit having many internal circuits. More particularly, this invention relates to a semiconductor integrated circuit which can realize lower power consumption by driving the internal circuits using a plurality of power supply voltages.

BACKGROUND OF THE INVENTION

Figure 7:
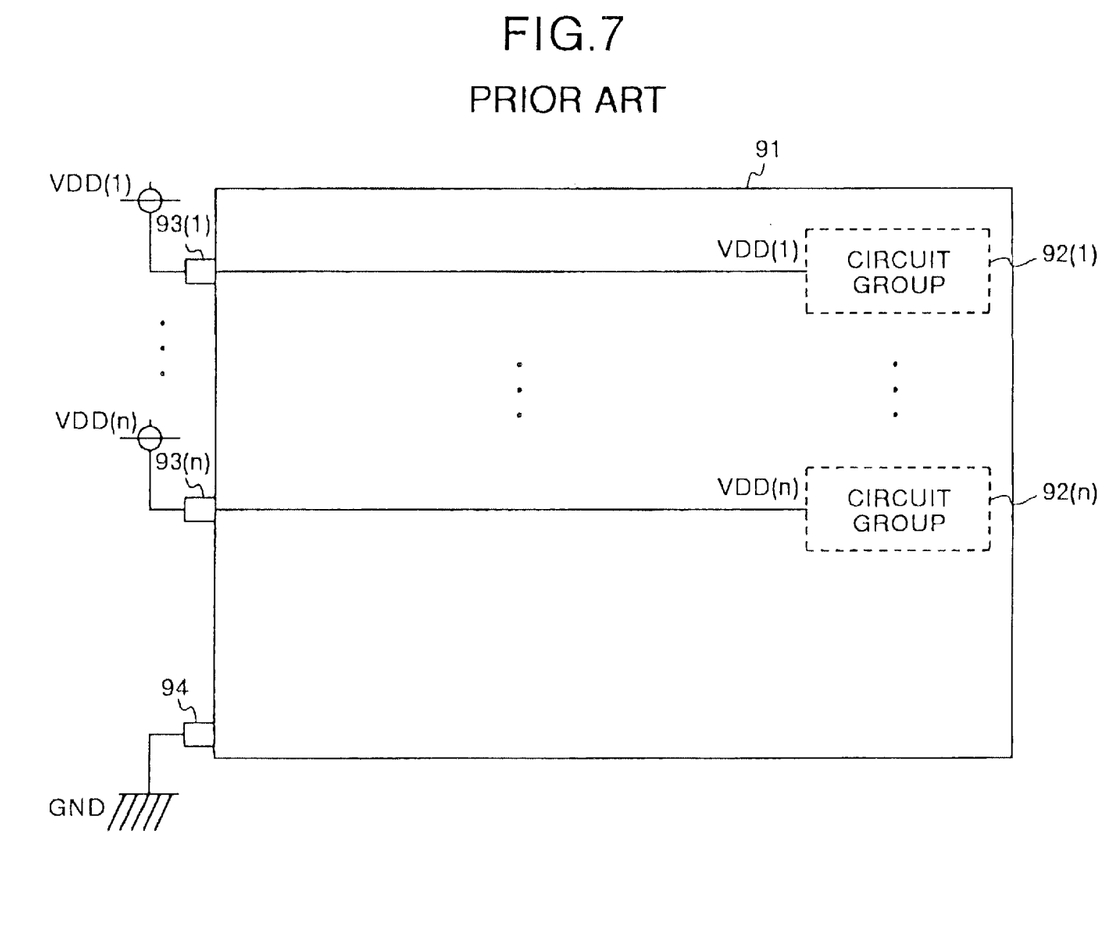
FIG. 7 schematically shows the configuration of a conventional LSI.

In recent years, lower power consumption of a semiconductor integrated circuit (henceforth, LSI) has been demanded in association with enhanced performance of mobile equipment. As a conventional LSI that allows low power consumption to be realized, there has been known one that uses a plurality of power supply voltages for circuit groups (internal circuits) of the LSI. FIG. 7 schematically shows a configuration of such a conventional LSI. This LSI 91 comprises a plurality of circuit groups 92 (1) to 92 (n) (where n is an integer), a plurality of power supply external terminals 93 (1) to 93 (n) that receive a plurality of power supply voltages VDD (1) to VDD (n) used for the circuit groups 92 (1) to 92 (n), and an external terminal 94 for a ground.

A plurality of power supplies, that generate a plurality of power supply voltages VDD (1) to VDD (n) used for the circuit groups 92 (1) to 92 (n), are provided outside the LSI 91 in the same number as that of the circuit groups 92 (1) to 92 (n). The power supply voltages VDD (1) to VDD (n) from these power supplies are provided to the circuit groups 92 (1) to 92 (n) via the power supply external terminals 93 (1) to 93 (n) in the same number as the number of the circuit groups 92 (1) to 92 (n).

Figure 8:
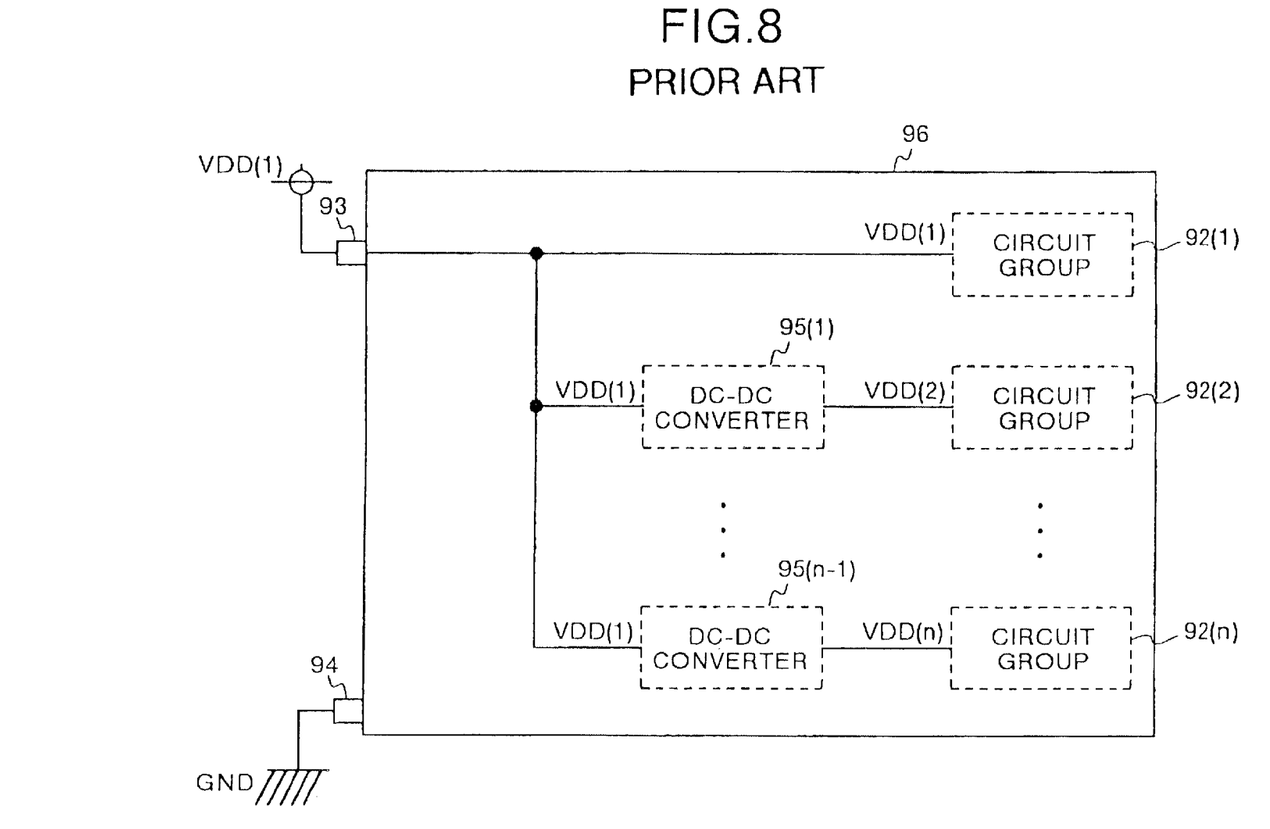
FIG. 8 schematically shows the configuration of another conventional LSI.

FIG. 8 schematically shows a configuration of another type of conventional LSI that allows lower power consumption to be achieved. This LSI 96 comprises a plurality of circuit groups 92 (1) to 92 (n), a power supply external terminal 93 that receives a power supply voltage VDD (1), an external terminal 94 for a ground, and DC—DC converters 95 (1) to 95 (n−1) used for voltage transformation. One unit power supply is provided outside the LSI 96. The power supply voltage VDD (1) provided from this power supply is provided to the circuit group 92 (1) via the power supply external terminal 93. The DC-DC converters 95 (1) to 95 (n−1) in the same number as that of the circuit groups 92 (2) to 92 (n) perform voltage transformation on the power supply voltage VDD (1) to generate power supply voltages VDD (2) to VDD (n), and supply the generated power supply voltages VDD (2) to VDD (n) to the circuit groups 92 (2) to 92 (n).

According to the conventional art, however, when power supply voltages used for internal circuits are input from the outside of the LSI, it is required to provide a plurality of power supplies outside the LSI and also provide a large number of power supply external terminals on the LSI. Therefore, there have been problems, for example, package size is increased due to an increase in the number of external terminals for the LSI and the circuit provided outside the LSI becomes complicated. Further, when DC-DC converters are provided inside the LSI, the same level of voltage is input into the DC-DC converters. However, output voltages are decided on the basis of the input voltages in the DC-DC converters. Therefore, there has also been a problem that a power supply voltage for each internal circuit can not be controlled after manufacturing the LSI and it is impossible to provide a power supply voltage adequate to actual characteristics of each of the internal circuits that differ depending on semiconductor processes or some other reasons.

SUMMARY OF THE INVENTION

It is an object of this invention to provide a semiconductor integrated circuit that allows a package to be minimized in size by reducing the number of external terminals in an LSI, simplification of a circuit outside the LSI, and supply a power supply voltage adequate to actual characteristics of each of internal circuits.

According to this invention, a plurality of first power supply units provide power supply voltages to internal circuits, a plurality of delay measurement units measure delays of circuit elements of the internal circuits, and a control unit makes the settings of the first power supply units based on the results of measurements in the delay measurement units to control each of the power supply voltages. Accordingly, the need for providing a large number of power supplies outside the semiconductor integrated circuit and the need for providing a large number of power supply terminals on the semiconductor integrated circuit are eliminated. Further, each power supply voltage can be adjusted based on the actual characteristics of each of the internal circuits.

Further, a storage unit stores a digital value according to the setting by the control unit, and a digital-to-analog converter outputs a power supply voltage corresponding to the digital value stored in the storage unit to the internal circuit. Accordingly, the power supply voltage to be supplied to the internal circuit can easily be controlled.

Further, the control unit determines whether the internal circuit requires high-speed processing, and makes the setting of the first power supply unit based on the result of measurement to control the power supply voltage. Accordingly, the power supply voltage responsive to the operation of the semiconductor integrated circuit can be supplied to each of the internal circuits.

Further, a second power supply unit provides a power supply voltage to the internal circuit when a supply of a power supply voltage by the first power supply unit is stopped. Accordingly, even when the operation of the first power supply unit is stopped, a power supply voltage can be provided to the internal circuit.

Further, the second power supply unit is configured with a PMOS transistor whose source is connected to an external power supply, and whose drain and gate are connected to an output terminal for a power supply voltage of the first power supply unit. Accordingly, even when the operation of the first power supply unit is stopped, a power supply voltage can be provided to the internal circuit.

Further, there is provided an external terminal connected to an output terminal for a power supply voltage of the first power supply unit. Accordingly, it is possible to stabilize a power supply voltage by connecting a capacitor between this external terminal and a ground or to use this external terminal as a monitor for a power supply voltage.

Other objects and features of this invention will become understood from the following description with reference to the accompanying drawings.

DESCRIPTION OF THE PREFERRED EMBODIMENTS

Preferred embodiments of the semiconductor integrated circuit according to this invention are explained in detail below with reference to the attached drawings. It should be noted that this invention is not limited by these embodiments.

Figure 1:
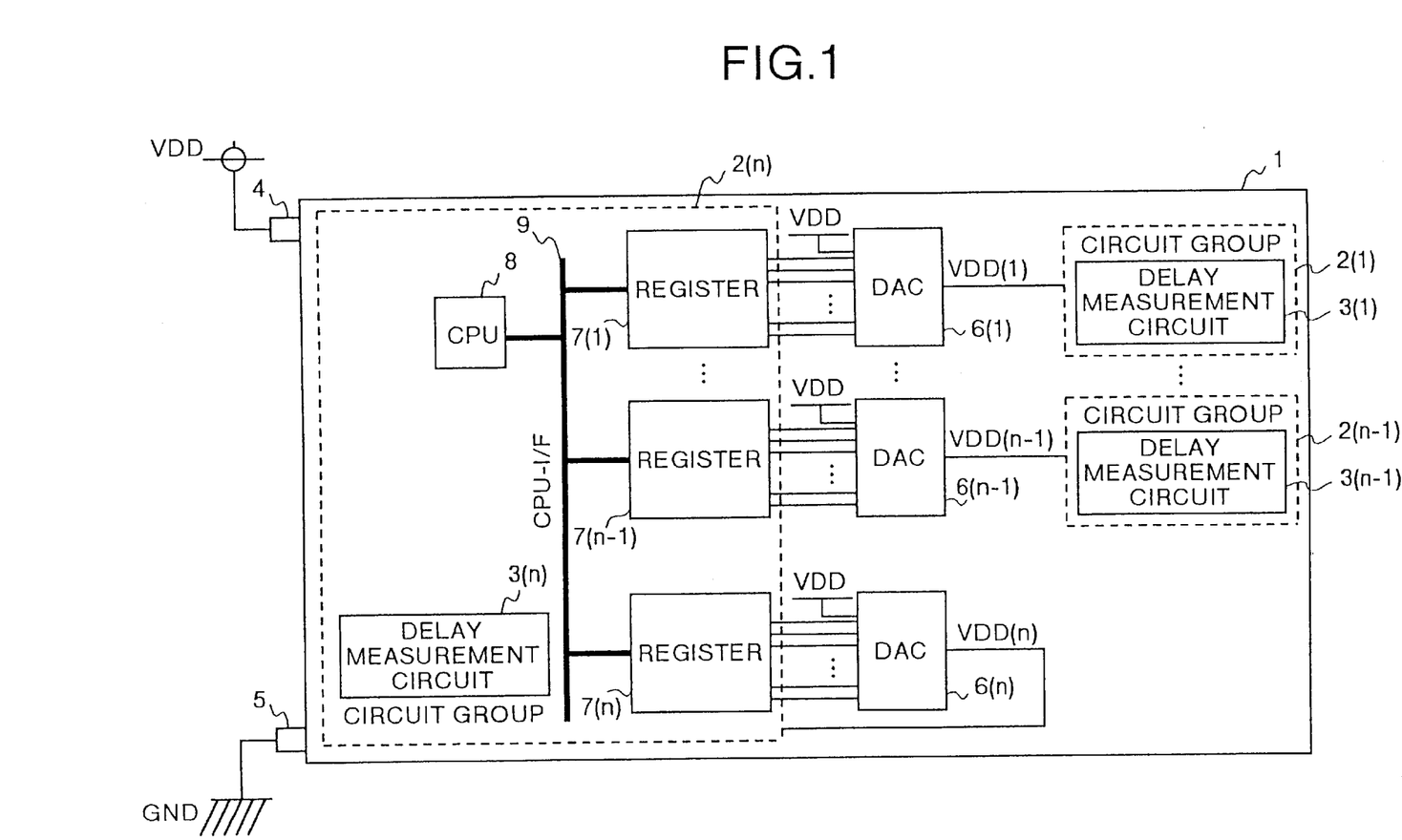
FIG. 1 schematically shows the configuration of an LSI according to a first embodiment of this invention.

FIG. 1 schematically shows the configuration of a semiconductor integrated circuit (henceforth, LSI) according to a first embodiment of this invention. This LSI 1 comprises a plurality of circuit groups (internal circuits) 2 (1) to 2 (n), and delay measurement circuits 3 (1) to 3 (n) which are provided in each of the circuit groups 2 (1) to 2 (n) and measure delays of circuit elements of the circuit groups 2 (1) to 2 (n), respectively. This LSI 1 further comprises an external terminal 4 used to input a power supply voltage VDD from an external power supply, an external terminal 5 for connecting to the ground, and digital-to-analog converters (henceforth, DAC) 6 (1) to 6 (n) that supply a plurality of power supply voltages VDD (1) to VDD (n) to be used in the circuit groups 2 (1) to 2 (n) to the circuit groups 2 (1) to 2 (n), respectively. This LSI 1 further comprises registers 7 (1) to 7 (n) that output digital signals based on set digital values to the DACs 6 (1) to 6 (n), respectively, a CPU 8 that sets the registers 7 (1) to 7 (n) based on the results of measurements in the delay measurement circuits 3 (1) to 3 (n) and an operating mode (such as high-speed processing or low-speed processing), and a CPU interface (CPU-I/F) 9 that connects for communications between the CPU 8 and each of the registers 7 (1) to 7 (n).

Each of the circuit groups (internal circuits) 2 (1) to 2 (n) may be a digital circuit or an analog circuit, and is obtained by grouping the circuits inside the LSI 1 based on conditions such as a power supply voltage, operation, a function, and an arrangement. Each of the delay measurement circuits 3 (1) to 3 (n) varies their respective output depending on the amount of delay of circuit elements such as a ring oscillator or an inverter chain, and measures a delay of each circuit element of the circuit groups 2 (1) to 2 (n) in which variations in the delay occur depending on how well a semiconductor process is performed or due to variations in temperature.

The DACs 6 (1) to 6 (n) operate by a power supply voltage VDD input via the external terminal 4 used for turning the power on, generate analog signals based on the digital signals from the registers 7 (1) to 7 (n), and provide the generated analog signals as power supply voltages VDD (1) to VDD (n) to the circuit groups 2 (1) to 2 (n). Each of the registers 7 (1) to 7 (n) is a nonvolatile memory such as flash memory, stores a digital value according to the setting from the CPU 8, and outputs a digital signal based on the stored digital value to each of the DACs 6 (1) to 6 (n).

The CPU 8 measures delays by controlling the delay measurement circuits 3 (1) to 3 (n) according to the test program stored in a not shown ROM, at the time of examination in a factory, for example. The CPU 8 then sets digital values according to characteristics of the circuit groups 2 (1) to 2 (n) based on the results of measurements in the registers 7 (1) to 7 (n). The CPU 8 may measure the characteristics of the circuit groups 2 (1) to 2 (n), that vary due to variations in temperature, at the time of actual use, and set the digital values according to the characteristics of the circuit groups 2 (1) to 2 (n) in the registers 7 (1) to 7 (n). Further, the digital values according to a required processing speed may be set in the registers 7 (1) to 7 (n).

The DACs 6 (1) to 6 (n) and the registers 7 (1) to 7 (n) correspond to the first power supply units of this invention. The CPU 8 corresponds to the control unit of this invention, and the registers 7 (1) to 7 (n) correspond to the storage units of this invention.

Figure 2:
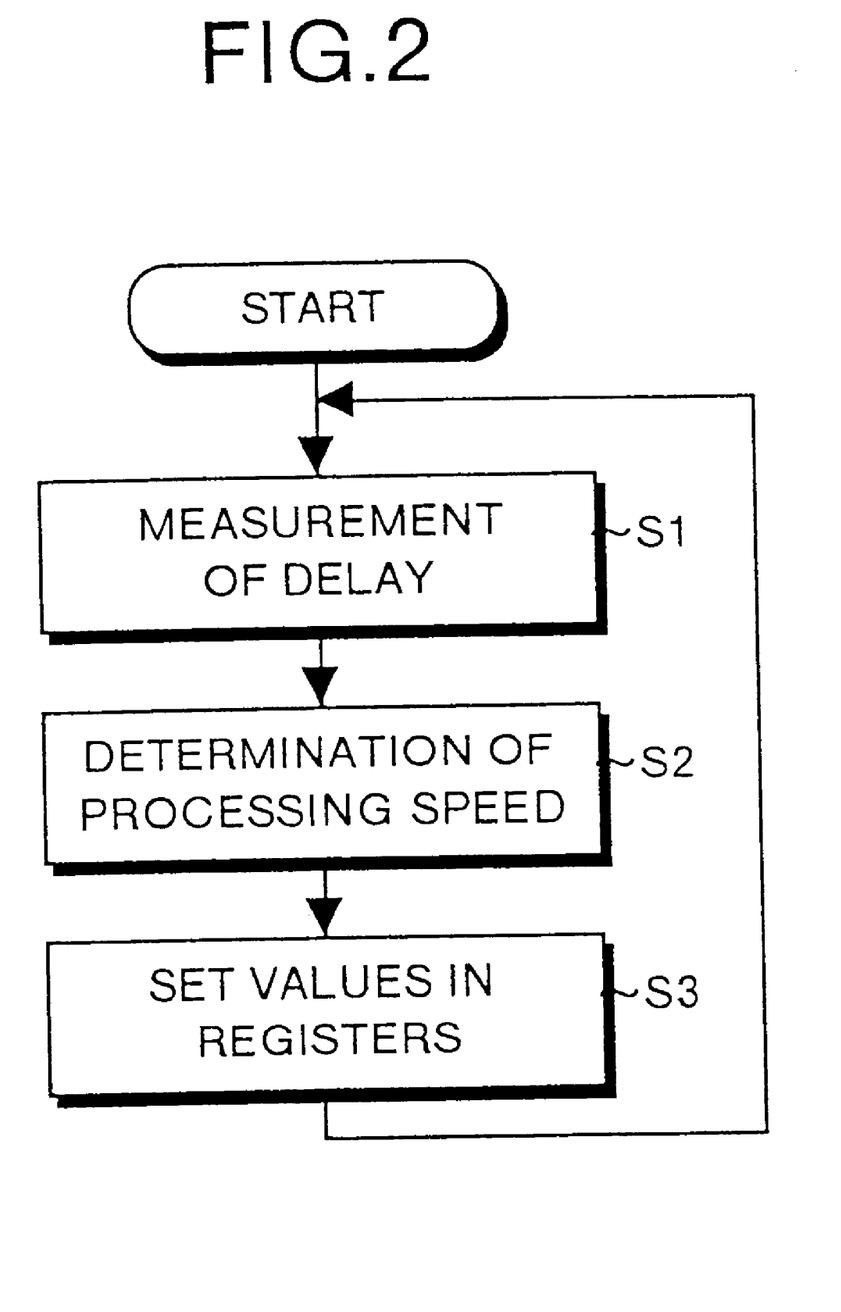
FIG. 2 shows a flow chart of the operations of the LSI according to the first embodiment.

Based on the above configuration, the operation of the first embodiment is explained with reference to FIG. 2 and FIG. 3. FIG. 2 is a flow chart showing the operations of the LSI 1 according to the first embodiment. To begin with, the CPU 8 measures each delay of the circuit groups 2 (1) to 2 (n) by controlling the delay measurement circuits 3 (1) to 3 (n) (step S1). The CPU 8 then determines whether the set operating mode indicates high-speed processing (step S2), and computes a digital value so that power supply voltages VDD (1) to VDD (n) are controlled to adequate voltages according to the characteristics of the circuit groups 2 (1) to 2 (n) and the operating mode. The CPU 8 sets the computed digital values in the registers 7 (1) to 7 (n) (step S3), and returns to step S1.

For example, if the delay is long and there is not much time for the operation, then the CPU 8 increases the power supply voltage so as to reduce the delay, whereas if the delay is short and there is time for the operation, then the CPU 8 decreases the power supply voltage to reduce the power consumption. If the operating mode indicates high-speed processing, the CPU 8 increases the power supply voltage so as to decrease the delay, whereas if the mode indicates low-speed processing, the CPU 8 decreases the power supply voltage so as to reduce the power consumption. Accordingly, the power supply voltages VDD (1) to VDD (n) are controlled to the optimal voltages matching the characteristics and the operations of the circuit groups 2 (1) to 2 (n).

Figure 3:
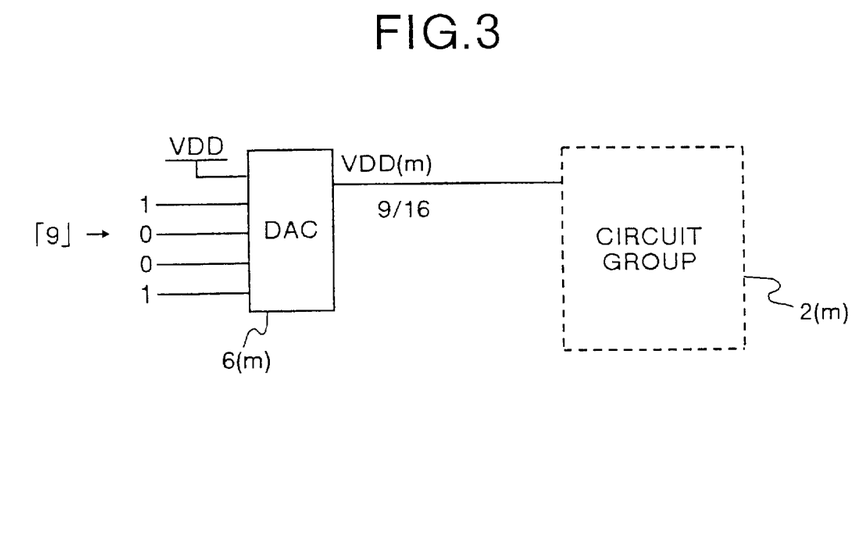
FIG. 3 hows operation of a digital-to-analog converter according to the first embodiment.

FIG. 3 shows operation of DAC according to the first embodiment. A DAC 6 (m) any one of the DACs 6 (1) to 6 (n). This DAC 6 (m) receives a 8-bit parallel signal of 0/1 (High/Low) from the corresponding register. In this example, the DAC 6 (m) receives a digital signal of "9" in decimal or "1001" in binary, and supplies an analog signal corresponding to the received digital signal as a power supply voltage VDD (m) to the corresponding circuit group 2 (m). For example, when the digital value is "9", the value of the power supply voltage VDD (m) becomes (VDD·9/16).

As explained above, the plurality of DACs 6 (1) to 6 (n) provide the power supply voltages VDD (1) to VDD (n) to the circuit groups 2 (1) to 2 (n), and the plurality of delay measurement circuits 3 (1) to 3 (n) measure delays of circuit elements of the circuit groups 2 (1) to 2 (n), respectively. Further, the CPU 8 makes the settings of the registers 7 (1) to 7 (n) based on the results of the measurements in the delay measurement circuits 3 (1) to 3 (n) to control the power supply voltages VDD (l) to VDD (n).

Accordingly, the need for providing a large number of power supplies outside the LSI 1 and the need for providing a large number of power supply terminals on the LSI 1 are eliminated. Further, the power supply voltages VDD (1) to VDD (n) can be adjusted based on the actual characteristics of the circuit groups 2 (1) to 2 (n), respectively. Therefore, it is possible to reduce the number of external terminals for the LSI 1, minimize a package, simplify the circuit outside the LSI 1, and also provide adequate power supply voltages VDD (1) to VDD (n) according to the actual characteristics of the circuit groups 2 (1) to 2 (n).

The CPU 8 makes the settings of the registers 7 (1) to 7 (n) to control the power supply voltages VDD (1) to VDD (n) according to whether the operating mode of the LSI 1 indicates high-speed processing or low-speed processing. Accordingly, since the power supply voltages VDD (1) to VDD (n) according to the operation of the LSI 1 can be supplied to the circuit groups 2 (1) to 2 (n), more adequate power supply voltages VDD (1) to VDD (n) can be provided. Although the case where the CPU 8 is provided inside the LSI 1 is explained in the first embodiment, the same effect can also be obtained even if the CPU 8 is provided outside the LSI 1.

Figure 4:
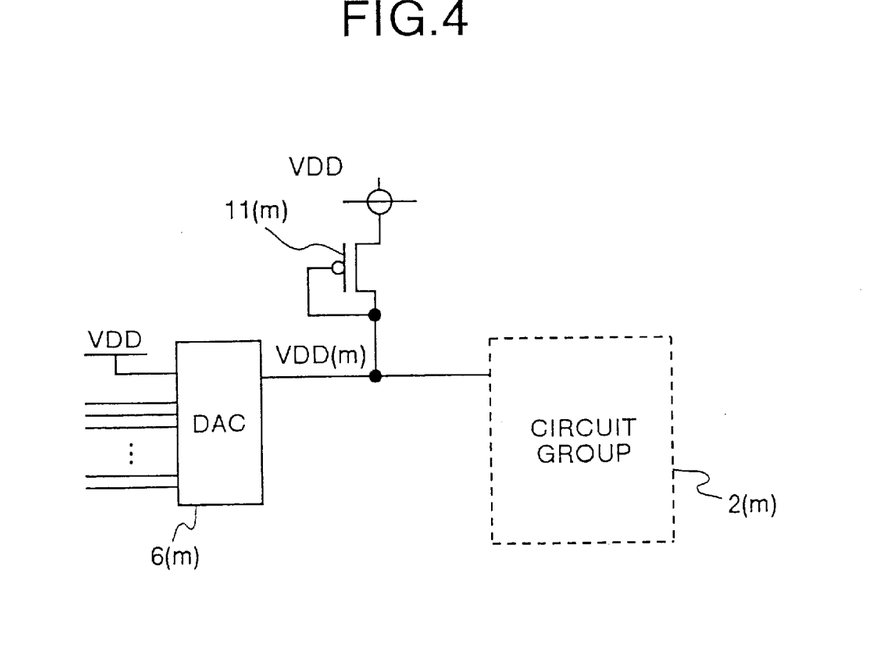
FIG. 4 schematically shows the configuration of an LSI according to a second embodiment of this invention.

A second embodiment of this invention is realized based on the first embodiment in which a power supply can be provided to a circuit group even when a DAC is OFF. The basic configuration and the operation of the second embodiment are the same as those in the first embodiment, therefore, explanation of the same sections is omitted. Thus, only the different sections will be explained below. FIG. 4 schematically shows a configuration of a LSI according to the second embodiment of this invention. The LSI of the second embodiment has a configuration such that a PMOS transistor 11 (m) is provided between arbitrary DAC 6 (m) and circuit group 2 (m) in the LSI 1 of the first embodiment.

The source of the PMOS transistor 11 (m) is connected to the external terminal 4 for a power supply, and the drain and the gate of the PMOS transistor are connected to the output terminal for a power supply voltage VDD (m) of the DAC 6 (m). This PMOS transistor may be provided between all the pairs of DACs and circuit groups within the LSI, or may be provided between any pair of the DACs and the circuit groups within the LSI. Further, some other power supply circuit such as a pull-up resistance maybe provided, replacing the PMOS transistor. The other sections of the configuration are the same as those of the first embodiment.

The operation of the second embodiment is explained below. In the operation of the second embodiment, before a value of the DAC 6 (m) is decided on resetting, namely even if the DAC 6 (m) has high output impedance, power is supplied to the circuit group 2 (m) via the PMOS transistor 11 (m). Especially, when a low consumption current is required, and if the current consumed by the DAC 6 (m) can not be neglected from the viewpoint of overall LSI, the amount of current required for the circuit block 2 (m) can be ensured by providing a current from the PMOS transistor 11 (m) while reducing current consumption by stopping the DAC 6 (m). The rest of the operation is the same as that of the first embodiment.

As explained above, according to the second embodiment, the source of the PMOS transistor 11 (m) is connected to the external terminal 4 for a power supply, and the drain and the gate are connected to the output terminal for the power supply voltage VDD (m) of the DAC 6 (m). Accordingly, even if the operation of the DAC 6 (m) is stopped, the power supply voltage VDD (m) can be supplied to the circuit group 2 (m). Therefore, power can be supplied to the circuit group 2 (m) immediately after resetting without a wait for the control by the CPU 8. Further, when low power consumption is especially required, power can be supplied to the circuit group 2 (m) while the operation of the DAC 6 (m) is stopped.

Figure 5:
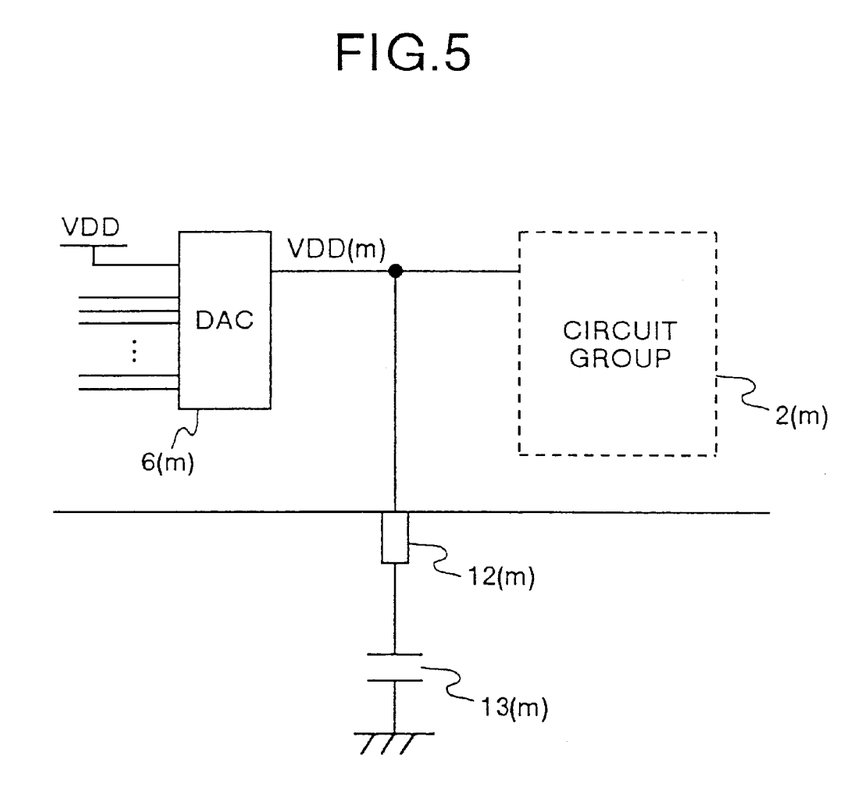
FIG. 5 schematically shows the configuration of an LSI according to a third embodiment of this invention.

A third embodiment of this invention is realized based on the first embodiment or the second embodiment in which an external terminal that takes out analog output of the DAC to the out side is provided. The basic configuration and operation of the third embodiment are the same as those in the first embodiment and the second embodiment. Therefore, explanation of the same sections is omitted, and only different sections will be explained below. FIG. 5 schematically shows a configuration of a LSI according to the third embodiment of this invention. The LSI of the third embodiment has a configuration such that an external terminal 12 (m) connected to the output terminal of an arbitrary DAC 6 (m) is provided in the LSI 1 of the first embodiment.

By connecting one end of a capacitor 13 (m) to the external terminal 12 (m) and grounding the other end of the capacitor 13 (m), a power supply voltage VDD (m) can be stabilized. Further, by using the external terminal 12 (m), the power supply voltage VDD (m) can be monitored at the outside location. As explained above, outputs of all the DACs within the LSI may be taken out to the outside, or output of some part of the DACs may be taken out to the outside. The rest of the configuration and operation is the same as those of the first embodiment.

Figure 6:
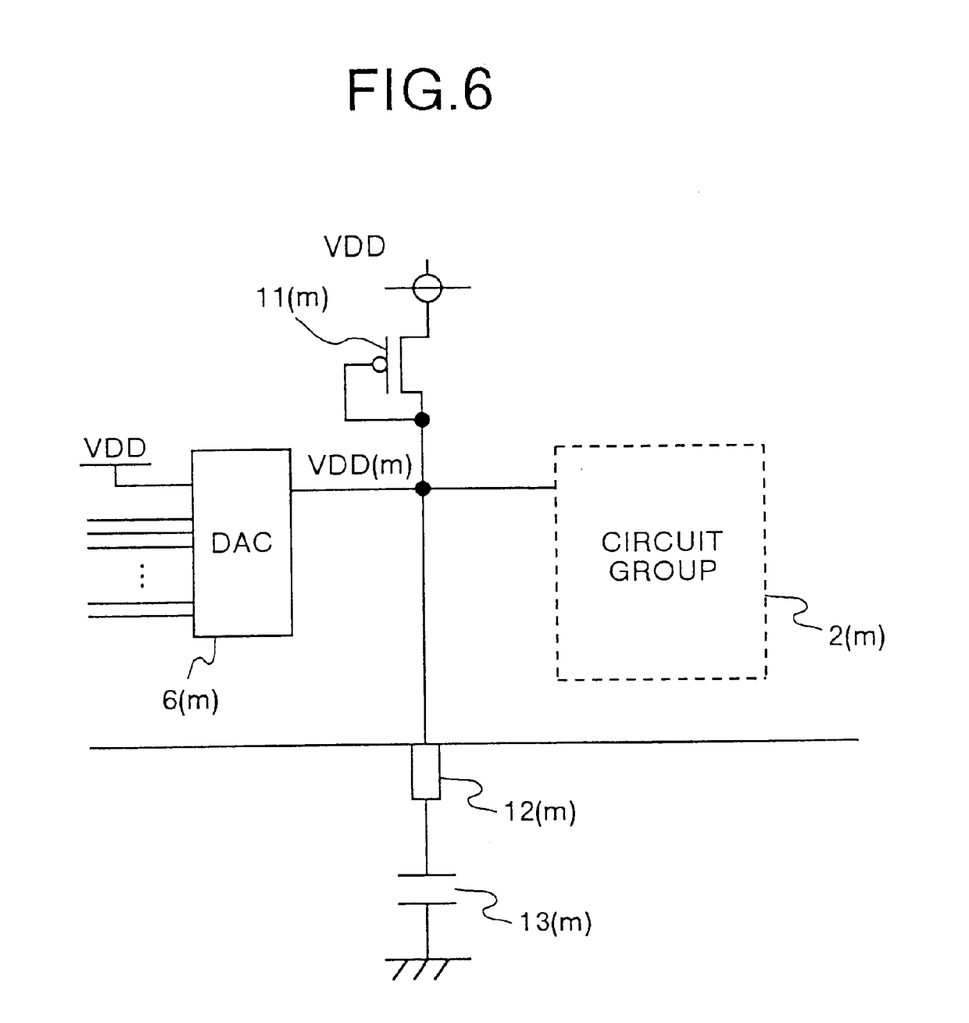
FIG. 6 shows the configuration of another LSI according to the third embodiment.

According to the third embodiment, as explained above, there is provided the external terminal 12 (m) connected to the output terminal for the power supply voltage VDD (m) of the DAC 6 (m). Therefore, it is possible to stabilize the power supply voltage VDD (m) by connecting the capacitor 13 (m) between this external terminal 12 (m) and the ground or to use this external terminal 12 (m) to monitor the power supply voltage VDD (m). As shown in FIG. 6, even if the external terminal 12 (m) connected to the output terminal of an arbitrary DAC 6 (m) is provided in the LSI of the second embodiment, the same effect can also be obtained.

According to this invention, the plurality of first power supply units provide power supply voltages to the internal circuits, and the plurality of delay measurement units measure delays of circuit elements of the internal circuits. Further, the control unit makes the settings of the first power supply units based on the results of measurements in the delay measurement units to control the power supply voltages. Accordingly, the need for providing a large number of power supplies outside the semiconductor integrated circuit and the need for providing a large number of power supply terminals on the semiconductor integrated circuit are eliminated. Further, each of the power supply voltages can be adjusted based on the actual characteristics of each of the internal circuits. Therefore, this invention has such advantages that a package can be minimized by reducing the number of external terminals of the LSI, the circuit outside the LSI can be simplified, and each of power supply voltages adequate to actual characteristics of each of internal circuits can be supplied.

Further, the storage unit stores a digital value according to the setting by the control unit, and the digital-to-analog converter outputs the power supply voltage corresponding to the digital value stored in the storage unit to the internal circuit. Therefore, this invention has such advantages that the power supply voltage to be supplied to the internal circuit can easily be controlled.

Further, the control unit determines whether the internal circuit requires high-speed processing, and makes the setting of the first power supply unit based on the result of measurement to control the power supply voltage. Accordingly, the power supply voltage responsive to the operation of the semiconductor integrated circuit can be supplied to each of the internal circuits. Therefore, this invention has such advantages that a more adequate power supply voltage can be supplied.

Further, the second power supply unit provides a power supply voltage to the internal circuit when a supply of a power supply voltage by the first power supply unit is stopped. Accordingly, even when the operation of the first power supply unit is stopped, a power supply voltage can be provided to the internal circuit. Therefore, this invention has such advantages that power can be supplied to the internal circuit immediately after resetting without a wait for the control by the CPU, and also power can be supplied to the internal circuit while the operation of the first power supply unit is stopped when low power consumption is especially required.

Further, the second power supply unit is configured with a PMOS transistor whose source is connected to an external power supply, and whose drain and gate are connected to an output terminal for a power supply voltage of the first power supply unit. Accordingly, even when the operation of the first power supply unit is stopped, a power supply voltage can be provided to the internal circuit. Therefore, this invention has such advantages that power can be supplied to the internal circuit immediately after resetting without a wait for the control by the CPU, and also power can be supplied to the internal circuit while the operation of the first power supply unit is stopped when low power consumption is especially required.

Further, there is provided an external terminal connected to an output terminal for a power supply voltage of the first power supply unit. Therefore, this invention has such advantages that it is possible to stabilize a power supply voltage by connecting a capacitor between this external terminal and the ground or to use this external terminal as a monitor for a power supply voltage.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A semiconductor integrated circuit comprising: voltages to said internal circuits;

a plurality of delay measurement units which measure delays of circuit elements of said internal circuits; and a control unit which establishes a setting of each of said first supply units based on measurements by said delay measurement units to control each of the power supply voltages.

2. The semiconductor integrated circuit according to claim 1, wherein each of said first power supply units comprises:

a storage unit which stores a digital value according to the setting by said control unit; and a digital-to-analog converter which outputs a power supply voltage corresponding to the digital value stored in said storage unit to said internal circuit.

3. The semiconductor integrated circuit according to claim 1, wherein said control unit determines whether said internal circuit requires high-speed processing, and establishes the setting of said first power supply units based on the measurement to control the power supply voltage.

4. The semiconductor integrated circuit according to claim 1 further comprising a plurality of second power supply units which supply power supply voltages to said internal circuits when the supply voltages supplied voltages by said first power supply units are stopped.

5. The semiconductor integrated circuit according to claim 1, wherein each of said second power supply units includes a PMOS transistor having a source connected to an external power supply, and a drain and a gate connected to an output terminal for a power supply voltage of one of said first power supply units.

6. The semiconductor integrated circuit according to claim 1 further comprising an external terminal connected to an output terminal of one of said first power supply units.

* * * * *